US005477677A

United States Patent [19]

Krnavek

[11] Patent Number: 5,477,677

[45] Date of Patent: Dec. 26, 1995

[54] ENERGY RECOVERY DEVICE

[75] Inventor: Frantisek Krnavek, Unicov, Czechoslovakia

[73] Assignee: Hydac Technology GmbH, Sulzbach/Saar, Germany

[21] Appl. No.: 244,536

[22] PCT Filed: Dec. 3, 1992

[86] PCT No.: PCT/EP92/02797

§ 371 Date: Aug. 26, 1994

§ 102(e) Date: Aug. 26, 1994

[87] PCT Pub. No.: WO93/11363

PCT Pub. Date: Jun. 10, 1993

[30] Foreign Application Priority Data

Dec. 4, 1991 [CS] Czechoslovakia .................... 3680-91

[51] Int. Cl.[6] .................................... F16D 31/02

[52] U.S. Cl. .......................... 60/414; 60/417; 60/426; 60/428; 60/494

[58] Field of Search ........................ 60/413, 414, 417, 60/454, 420, 426, 428, 484, 483, 486; 91/511

[56] References Cited

U.S. PATENT DOCUMENTS

| | | | |
|---|---|---|---|
| 4,046,270 | 9/1977 | Baron et al. | 60/413 X |
| 4,706,930 | 11/1987 | Lexen | 251/26 |
| 4,738,101 | 4/1988 | Kubik | 60/413 |
| 4,969,562 | 11/1990 | Saotome | 60/413 X |
| 5,245,826 | 8/1993 | Roth et al. | 60/413 |

FOREIGN PATENT DOCUMENTS

| | | | |
|---|---|---|---|
| 0230529 | 8/1987 | European Pat. Off. . | |
| 1593306 | 5/1970 | France . | |
| 2106337 | 5/1972 | France . | |
| 2823435 | 12/1979 | Germany . | |
| 4031808 | 4/1992 | Germany | 60/413 |
| 250128 | 12/1985 | Japan . | |
| 0641177 | 1/1979 | U.S.S.R. | 60/413 |
| 1231585 | 5/1971 | United Kingdom . | |

OTHER PUBLICATIONS

Mannesmann Rexroth brochure RD 81 81010/6.86; Jun. 1986.

*Primary Examiner*—Edward K. Look
*Assistant Examiner*—Hoang Nguyen
*Attorney, Agent, or Firm*—Roylance, Abrams, Berdo & Goodman

[57] ABSTRACT

A device for recovering energy, in particular potential energy in working machines, has a hydraulically actuatable working cylinder linked to a hydropneumatic storage. At least another working cylinder is provided. The two working cylinders are mutually linked by their rod end chambers to transfer fluid and are linked to a hydraulic circuit having at least one pump. The other working cylinder is also linked at its piston end chamber to a hydraulic circuit having a pump. The energy generated by the movements of the working machine can be effectively stored in a failure-proof manner and called back at defined moments in time.

13 Claims, 4 Drawing Sheets

ENERGY RECOVERY DEVICE

PCT APPLICATION

Figure 1:
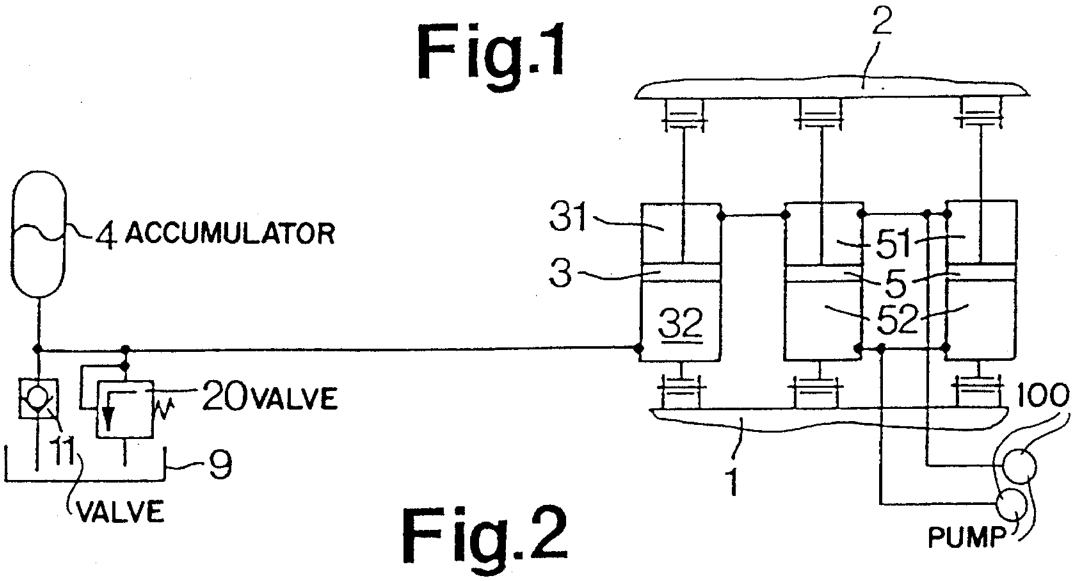

[PCT/EP92/02797. Application date Dec. 3, 1992. Priority claimed from Dec. 4, 1991, Czechoslovakia, PV 3680-91. Applicant: HYDAC TECHNOLOGY GmbH, Germany. Inventor: Frantisek KRNAVEK. International publication number WO 93/11363. International publication date: Jun. 10, 1993. States included: CS, JP, US. European patent states —AT, BE, CH, DE, DK, ES, FR, GB, GR, IE, IT, LU, MC, NL, PT, SE.]

The invention relates to a device for the recovery of energy, especially the recovery of potential energy in working machines, with a hydraulically operable working cylinder which is connected to a hydropneumatic storage. Such devices are also to be used as devices for the recovery of energy. Such devices can be used by any type of working machine which has a working cylinder or a hydraulically operated in-line motor. They are used particularly in construction and earthworking machines, such as for example a hydraulically operated bucket dredge or power shovel [hereinafter power shovel].

Such a device is already known from British Patent 1 231 585. In this known power shovel device, when the arm is lowered a portion of the hydraulic energy in the working cylinder is held back in the storage and a resulting volume of fluid is fed back into the reservoir after being moved to a predeterminable position by the arm controlled by a control key. Then for raising the arm, the energy which is thus stored in the form of the fluid pre-stored in the storage can be fed back into this arrangement to support and assist the working cylinder. This known device is not in a position to facilitate adequate energy recovery from the storage to any degree worth mentioning.

With other known devices for recovery of potential energy, this energy, in the form of hydrostatic energy, is held back with the aid of a system of proportional hydraulic distributors. The devices are complicated and thus are not very lucrative.

With another known device for recovery of the potential energy (Poland Patent 127 710), the working member is provided with an additional hydraulic in-line motor (working cylinder) of simple operation, which is mounted between the machine frame and the working member and is series-connected with a hydropneumatic storage [accumulator] and also with a container or a hydrogenerator, by means of a distributor. With this device the extremely high construction costs are a drawback, especially relative to the additional in-line motor and the distributor, which thus lowers the cost effectiveness of the device.

In another known device for recovery of potential energy (Czech Author's Certificate 268 933), the working member is provided with an accumulator/storage-in-line motor, of which the piston chamber is filled with compressed gas and is connected with the storage reservoir of the same. This device cannot be totally sealed, as a result of unintended gas leakage, so that the device can lose its functional capacity after a relatively short time. Also, the static carrying capacity [bearing strength, supporting capacity] is not constant, since the gas pressure is variable in relation to the position of the working member of the power shovel. Furthermore the maximum-acting lift force of the machine can be attained only together with the additional hydraulic working cylinder.

Another drawback of all of the previously known devices for recovery of the potential or kinetic energy of that sort of working member resides in that the acting force decreases when the working member is lowered.

Based on this state of the art, the object of the invention is to disclose an improved device for recovery of energy.

One important problem is solved with the features of the present invention. Two working cylinders are connected carrying fluid one above the other on the rod side and are attached to a hydraulic circuit which has at least one pump, the volume of fluid of the working cylinder on the piston side, which is connected with the storage, can be completely transferred or released into this storage, whereupon the procedure can be repeated many times consecutively, so that a precisely quantifiable measure/quantity of energy can be held in storage in the storage accumulator for a later call to use. In order to support or assist in a lifting or pivoting movement of the relevant working member, the energy stored in the storage is then at least partially called up and simultaneously another working cylinder or in-line motor is acted upon with the fluid or the fluid pressure which arises from a feed pump in the hydraulic circuit. On the basis of energy recovery by means of the device, this pump however needs to have only a small load capacity, which lowers the costs both in terms of operation and also in terms of manufacture and thus increases the cost effectiveness with working machines. Also with the device according to the invention higher work cycles can be attained with identical load capacities.

With one preferred embodiment of the device according to the invention, a hydraulically operable switching device is present between the piston chamber of the working cylinder connected with the storage and the storage itself.

With one further especially preferred embodiment, a hydraulically operable reverse switching device is connected between the piston chamber of the working cylinder, which is attached to the storage, and said storage, which has a reservoir attachment. In this case the hydraulically operable switching device and the reverse switching device preferably are series-connected in series one after the other.

In one further especially preferred embodiment of the device according to the invention, the piston chamber of the working cylinder connected with the storage by means of a fluid-carrying conduit is linked with the piston chambers of the other working cylinders, in which is operated a nonreturn valve or what is called a single-slide valve. It is preferable to have a throttle element associated with a single-slide valve, the throttle valve operated hydraulically in series and a return flow branch or a branch line of piston rod chambers of selected hydraulic linear units communicating with one another, through the distributor of the hydraulic machine system, stands in connection with the piston chamber of the hydraulic in-line motor attached to the hydropneumatic storage [accumulator]by means of the single-slide valve, and as a result of this, this return flow branch or the branch line is attached to a liquid container by means of a pressure valve.

The piston chamber of the hydraulic working cylinder is crossed with the hydropneumatic storage by means of a control device formed by a sliding or slide valve. This and this device is attached by its control input originating in a low pressure branch of the working member. Between a reservoir attachment of the control distributor of control device and the piston chamber of the hydraulically working cylinder crossed with this device is located an exchange or reversing valve, which is attached at the output to a feed channel. The reservoir attachment of the control distributor communicates with the piston rod chambers of the drive cylinder which are linked with one another, and which are further crossed with a hydraulically operable cylinder, of which the axis of symmetry is preferably identical with the axis of symmetry of the pin of a safety valve [or vacuum pressure or relief valve, hereinafter safety valve], and the piston of this cylinder is supported on the feed side of the pressure or hydraulic fluid to the safety valve against the front of the plug of this valve.

The primary advantage of the device according to the invention for recovery of the potential energy of a working member of construction or earthworking machines resides in that by its crossing with one of the hydraulic in-line motors (working cylinders) for lifting or lowering of the crosspiece, it makes possible the use of relatively high work pressure and relatively low flow-through volume of pressure fluid or hydraulic fluid, which lowers production costs and at the same time increases the effectiveness of the device, whereupon the cost effectiveness of the device as a whole is increased. Furthermore it is advantageous that the device as a whole is in a compact, relatively small structural unit which optionally also can be used as an additional attachment for subsequent assembly in the case of working machines which are already in use. Finally, during lifting as well as lowering of the working member, for instance in the form of a crosspiece of the relevant machine, the device of the invention makes it possible to use all of the acting force which is theoretically available.

The device according to the invention is explained in greater detail in the following specification relating to the drawing.

In the drawing, FIGS. 1 to 8 show diagrams of various embodiments of the device for recovery of energy.

FIG. 1 shows an embodiment of the device according to the invention with two hydromotors or working cylinders 5 working rectilinearally for raising and lowering a working device 2. The arm of working device 2, e.g. embodied as a hydraulic power shovel, is also provided with at least one further rectilinearally working hydraulic motor or working cylinder 3. Drive cylinder 3 is configured to be double-acting and mechanical and is incorporated by means of link joints between the frame 1 and arm of working device 2. The piston chamber 32 of working cylinder 3 is filled with a pressure fluid and attached to a hydropneumatic storage 4, provided with a safety valve 20 and an intake, suction or admission valve or nonreturn valve 11 attached to a liquid container 9. The piston rod chamber 31 of working cylinder 3 is likewise filled with a liquid and attached to piston rod chamber 51 of another working cylinder 5, which cooperates with working device 2. Working cylinders 3 and 5 are configured to be essentially identical.

Figure 2:
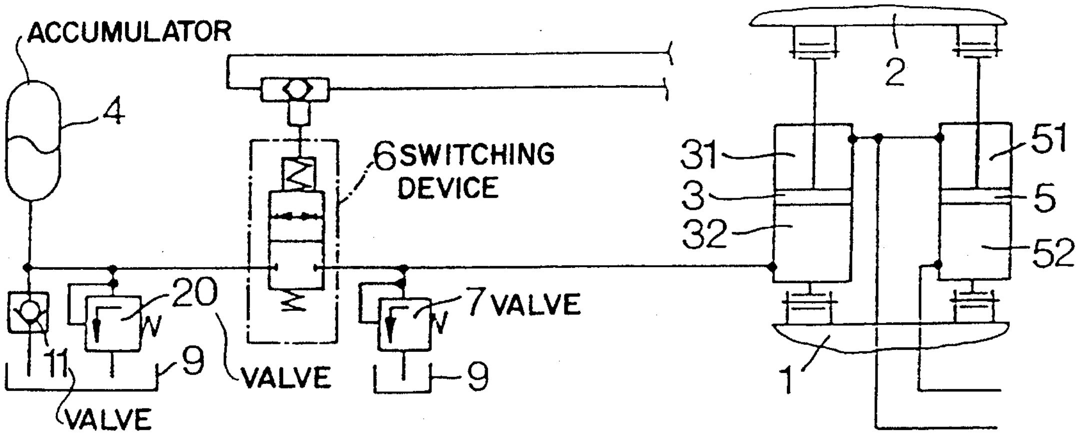
Figure 3:
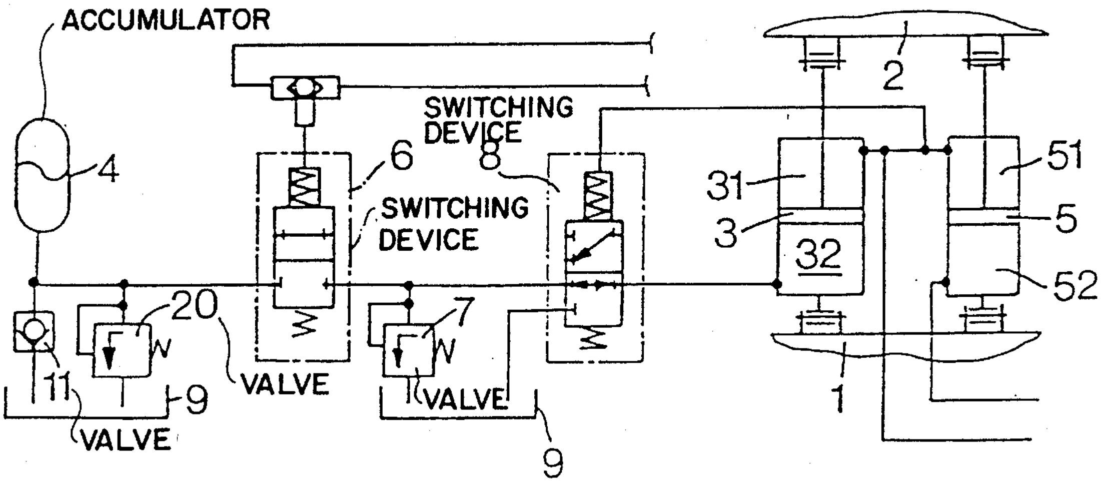

FIGS. 2 and 3 show another embodiment in the form of a hydraulically operable switching device 6 inserted in between piston chamber 32 of working cylinder 3 and hydraulic pneumatic storage 4, for instance in the form of a diaphragm and a [bubble/ blowing/cavitation] storage (FIG. 2), and a reverse switching device 8 can be inserted into this switching device 6 in series one after the other in the circuit(FIG. 3). Piston chamber 32 of the double-acting rectilinearally working cylinder 3 is attached in front of switching device 6 to a liquid container 9 through a safety valve 7 in the form of a pressure-limiting valve. Hydraulic switching device 6 is for instance a valve configured as a 2-way valve, which can be operated in response to a hydraulic signal and also in response to an electric signal, generated by swiveling of the control device by the operator into raising or lowering position to raise or lower working device 2.

When the device is stationary the static carrying force of working device 2 in the form of an arm or crosspiece is established for the purpose of lowering impulse by the static pressure set on the safety valve of the hydraulic system of the machine, which acts or reacts on piston chambers 52 of the relevant working cylinder 5 of working device 2, and is further adjusted by the momentary working pressure in hydropneumatic storage 4, which acts in piston chamber 32 of the storage-hydraulic motor or working cylinder 3.

In another embodiment, when working device 2 is stationary, hydraulic switching device 6 is set in locked position. The static bearing capacity of working device 2 in the process of lowering is then determined by the maximum pressure placed on the safety valve of the hydraulic system, and said pressure acts in piston chamber 52 of working cylinder 5 and further through the static pressure placed on safety valve 7, which works in piston chamber 32 of working cylinder 3. It is advantageous when the pressure of safety valve 7 corresponds with the pressure of the safety valve of the hydraulic system of the working machine, and preferably is set to be identical to it. The static bearing capacity of working device 2 for the purpose of the lowering is then determined only by the static pressure placed on the safety valve of the hydraulic system of the machine, which acts in piston rod chambers 31 and 51 and acts on working cylinder 3 or 5. Thus with this embodiment a greater static bearing capacity is attained on both sides. When working device 2 is lowered, the pressure fluid is fed out of the hydraulic system of the machine to the relevant piston rod chamber 51 of working cylinder 5 and piston rod chamber 31 of the storage-hydraulic motor or working cylinder 3. The pressure liquid is pressed out of piston chamber 52 through the hydraulic system of the machine into liquid container 9 and the filler liquid out of piston chamber 32 of working cylinder 3 into hydropneumatic storage 4. The piston of working cylinder 3 is raised by the pressure of the liquid in hydropneumatic storage 4, whereupon the lowering of working device 2 is limited, without using the energy stored in hydraulic pneumatic storage 4.

In the case of another exemplary embodiment, with the lowering of the working device the resistance forces of the working member rises above null in such a manner that the pressure in linked piston rod chambers 31 and 51 rises, whereupon hydraulic reverse switching device 8 reverses, which connects piston chamber 32 with liquid container 9 and separates this piston chamber 32 from storage 4. As a result of this, an increase of the acting force is generated with the lowering of working device 2. When working device 2 is raised, the pressure fluid is fed to the relevant piston chamber 52, whereupon working device 2 is raised and through pressure of the gas in the storage and the liquid or fluid in storage 4 for the necessary linear movements of the relevant working cylinder 3, energy is removed and consequently is utilized.

The device according to the invention for recovery of the potential energy of a working device can be used advantageously in construction and earthworking machinery, and the embodiment of FIG. 1 is especially advantageous for machines wherein great force is required of the working device, for instance for loading machines, hoisting devices or elevators, universal hydraulic shovels and for loading and lifting devices.

The embodiment of FIG. 2 is especially advantageous for the sorts of machines in which small loads are placed on the lift impulse force of the relevant working device and which are provided with an automatic drive effecting the primary work members, for instance for hydraulic power shovels used in a deep ditch-digger.

The embodiment of FIG. 3 is advantageous for the same use as that for the object of FIG. 2 as has already been described, in which however the force is used with lowering of the working device at the same time as a moving or translation force is applied directly to the working member of the machine.

Other embodiments are disclosed in FIGS. 4–8. In these cases too the working member is embodied for instance in the form of a hydraulically operated shovel on a digger preferably provided with two identical hydraulic in-line motors or working cylinders 3 and 5, which are mounted between machine frame 1 and crosspiece 2. At least one hydraulic working cylinder 3 is crossed by means of its piston chamber 32 with a hydropneumatic storage 4 and is provided with a safety valve 7. Piston chambers 52 and 32 of the described working cylinders 5 and 3 communicate with one another through a single-slide or one-way valve 14.

In one embodiment the one-way valve 14 is connected in series with a throttle element 15, for instance in the form of an adjustable throttle valve, an orifice plate or a throttle nozzle; likewise piston chambers 52 and 32 are linked with one another by means of a universally variable throttle profile. A return flow branch leading from piston rod chamber 51 or 31 of working cylinder 5 or 3 which are linked with one another is connected behind the distributors of the hydraulic machine system with piston chamber 32 of hydraulic working cylinder 3 through a single-slide or one-way valve 11. Because of that, the branch line 12 is placed in connection with a liquid container 9 through a pressure valve 10, which is set preferably at medium pressure in branch line 12 of the standard hydraulic system of the working machine.

Figure 5:
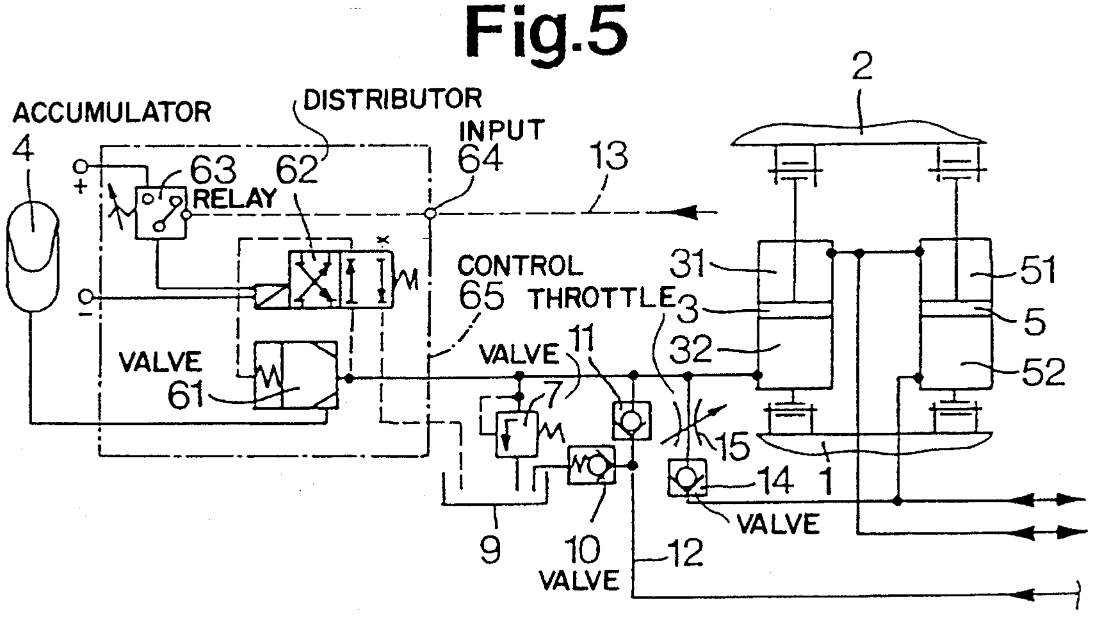

FIG. 5 shows another variation, in which piston chamber 32 of working cylinder 3 is crossed with the hydropneumatic accumulator or storage 4 by means of the control device 65. Control device 65 has a sliding valve or cartridge valve 61, a control distributor 62 in the form of a four part, two-way valve and a pressure relay 63, which in the case of an electrically controllable distributor 62 can also be in the form of an electric limit switch.

With its control input 64, control device 65 is hydraulically linked with a low pressure branch 13, which cooperates with crosspiece 2—if the actuating electric limit switch is used—and a spring-biased contact is introduced in the range of transmission or else directly to the movable component parts which are mechanically coupled with the plate of the section of the distributor of hydraulic machine system for the movement or release of crosspiece 2.

Figure 6:
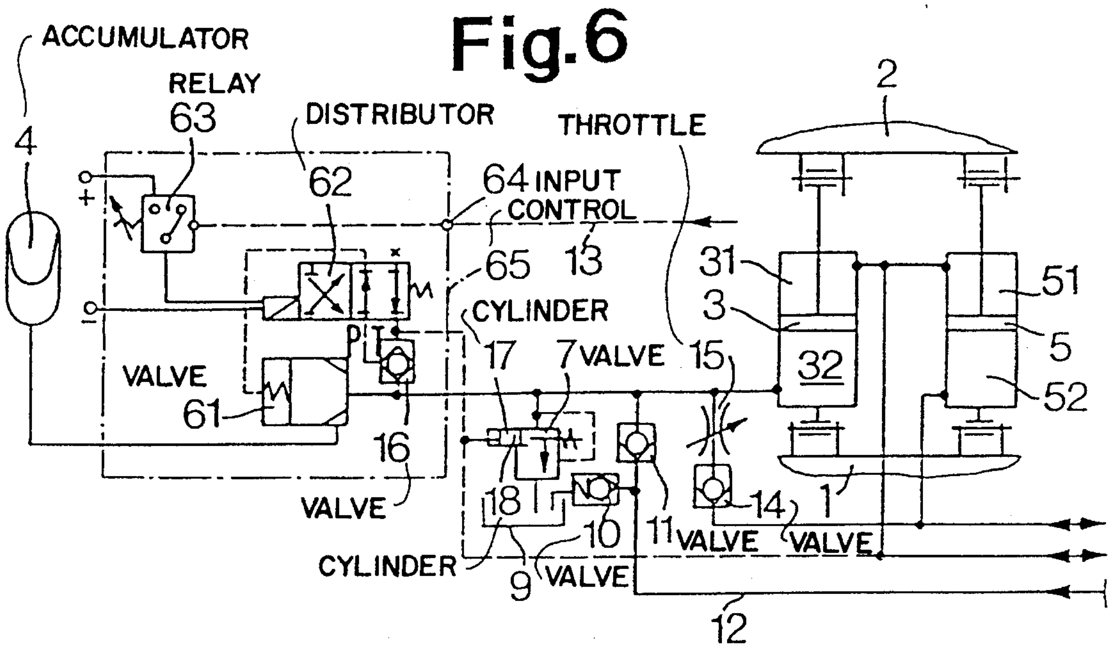

In FIG. 6, a two-way or changeover valve 16 is built in between a passage T of control distributor 62 and piston chamber 32 of hydraulic working cylinder 3 attached to control device 65, and the output of this two-way or changeover valve is connected with a feed passage P of control distributor 62. This passage T leading to the reservoir from control distributor 62 is also bolted to piston rod chambers 31 and 51 which are linked in communication with one another, and which are crossed with a hydraulically operable setting cylinder 17. The symmetrical longitudinal axis of this cylinder 17 is identical with the extended axis of the plug part of safety valve 7. Piston 18 of hydraulically operable setting or adjusting cylinder 17 has preferably the diameter corresponding to the diameter of the active part of the plug of safety valve 7, and is supported on the feed side of the feed of pressure fluid to safety valve 7 against the front of the plug of this valve 7.

The load of the motor and the hydraulic generators can be decreased by use of a lower load capacity drive unit or by lowering the setting, such as for example by decreasing the velocity of the motor by reversal of the control lever contact of the injection pump of the diesel motor.

Figure 4:
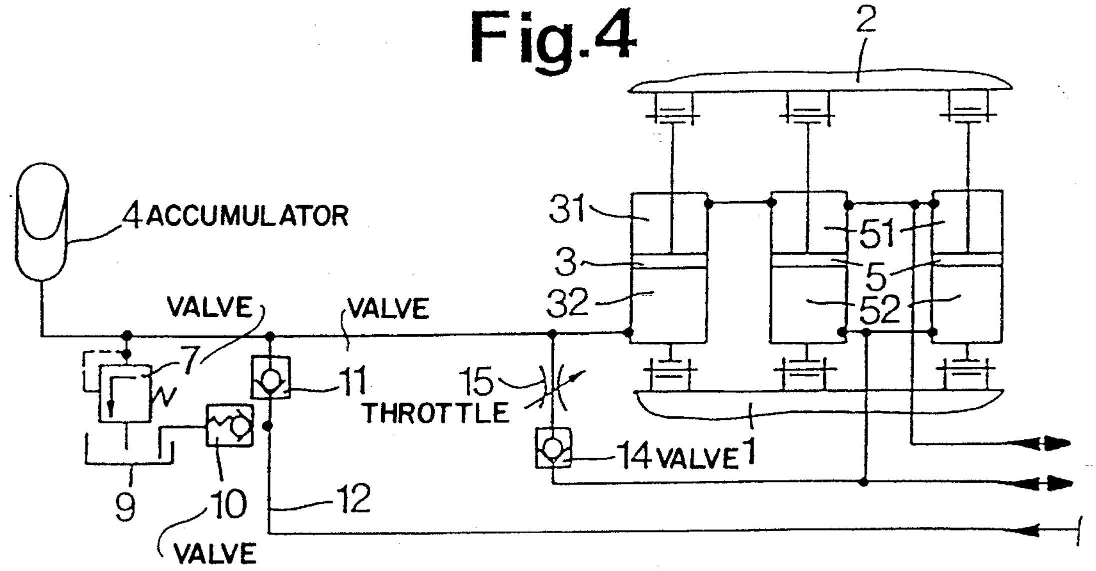

When crosspiece 2 is set at neutral position as in the embodiment of FIG. 4 the bearing capacity for lowering the crosspiece can be set by pressure applied to the secondary safety valve of the hydraulic machine system and working in piston chamber 52 of working cylinder 5 as well as by the pressure working momentarily in piston chamber 32 of hydraulic working cylinder 3, produced in hydropneumatic storage 4, and the cited pressure is variable dependent upon the relevant position of crosspiece 2.

In the variation shown in FIGS. 5 and 6, control device 65 has set crosspiece 2 in neutral position in the connecting setting. The static bearing capacity, again for the purpose of lowering crosspiece 2, is determined by pressure placed on the secondary safety valve of the hydraulic machine system as well as by pressure exerted on safety valve 7. The pressure of safety valve 7 is preferably adjusted to be the same as the pressure of hydraulic machine system.

In the embodiment of FIGS. 4 and 5, the bearing capacity is lowered for lowering of crosspiece 2 until it is in neutral position relative to the lifting force, which is proportional to the momentary pressure in hydropneumatic storage 4; this pressure works in piston chamber 32 of hydraulic in-line motor or working cylinder 3 and is variable dependent upon the setting of crosspiece 2.

When crosspiece 2 is in neutral position as shown in the embodiment shown in FIG. 6, the total bearing capacity is produced for raising crosspiece 2, since piston 18 forming the front of the plug of safety valve 7 decreases the safety pressure of this valve 7 to zero with full pressure in the communicating linked piston rod chambers 31 and 51, when this pressure closes the sliding valve or cartridge valve 61 of control device 65 at the same time, which aids in avoiding lowering of pressure and loss of hydrostatic energy in hydropneumatic storage 4. With swinging out of the operating mechanism or the starting arrangement of crosspiece 2, pressure fluid is pressed out of piston chamber 52 by means of the distributor of the hydraulic system into liquid container 9, and out of piston chamber 32 into hydropneumatic storage 4 either directly or through opened cartridge valve 61 of control device 65. The piston of hydraulic in-line motor 3 is raised by pressure in hydropneumatic storage 4, and it also works in piston chamber 32, whereupon crosspiece 2 is lowered without waste of energy only within a certain limit, since the energy is restored in hydropneumatic storage 4.

With lowering of crosspiece 2, for instance counter to the resistance of the earth surface encountered with digging [trench etc.], the acting lowering force is decreased in response to a raising force which is proportional to the pressure produced in hydropneumatic storage 4 and working in piston chamber 32.

In FIG. 6, with lowering of crosspiece 2 and because of the resistance of the mass of earth, the total acting lowering force is attained, since piston 18 controlling the front of the plug of safety valve 7 lowers the safety pressure of the same to zero with total pressure in the linked communicating piston rod chambers 31 and 51, when this pressure results simultaneously in the closing of cartridge valve 61 of control device 65, which has been reduced by lowering the pressure and the loss of hydrostatic energy out of hydropneumatic storage 4.

With swinging of the adjustment part of crosspiece 2 the pressure fluid is guided out of the hydraulic machine system to piston chamber 52, which raises crosspiece 2, whereby crosspiece 2 is raised by the pressure produced in hydropneumatic storage 4 and by the effect of the piston in hydraulic working cylinder 3 either directly or by means of opened sliding or cartridge valve 61 of control device 65, whereupon the energy stored beforehand in hydropneumatic storage 4 is utilized. Insofar as the pressure in hydropneumatic storage 4 drops below the pressure level in piston chamber 52, piston chamber 32 of hydraulic in-line motor 3 is fed pressure fluid by means of one-way valve 14, optionally also by means of throttle element 15, whereupon the loss of pressure fluid caused by leakage of the apparatus compensated at least during the time of optional pressure fluid surplus arising as a result of greater opening of throttle element 15 guarantees the production of the total work pressure in hydropneumatic storage 4 even when the lift of crosspiece 2 has been minimized. With a still greater opening of throttle element 15 or if it breaks down, raising crosspiece 2 to a certain position to balance the pressure in piston chambers 52 and 32, so that the pressure fluid is supplied to both chambers 52, 32 only out of the hydraulic machine system, which guarantees production of total acting lift force of crosspiece 2. Thus simultaneously hydropneumatic storage 4 is closed and its pressure does not exceed the level of pressure balance, whereby this pressure balance can also be attained in the highest position of crosspiece 2 in piston chambers 32 and 52 by means of the working cylinder.

The device of FIGS. 4 to 6 is also suitable for recovery of the potential energy of the working member, preferably on construction and earthworking machines, especially however in hydraulic shovels and loading machines with relative high work loads and with at least two hydraulic in-line motors for raising and lowering the working member.

The embodiment having a throttle element 15 is suitable for loading machines with relatively high load stresses in relation to the acting lift force of the crosspiece as well as for shaft-sinking members of hydraulic shovels with slower and nonuniform lifting frequency of the crosspiece. The embodiment having control device 65 contributes to the heightening of the working protection or security. The embodiment of FIG. 6 is also suitable especially for joining to machines subjected to high carrying stresses with regard to the regular lowering force of the working member.

Figure 8:
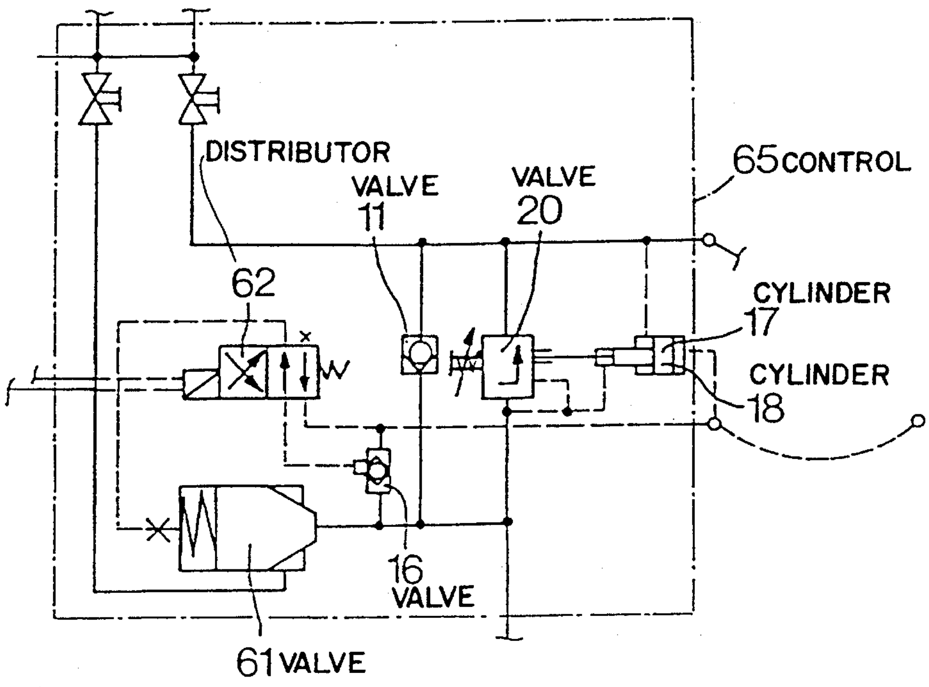
Figure 7:
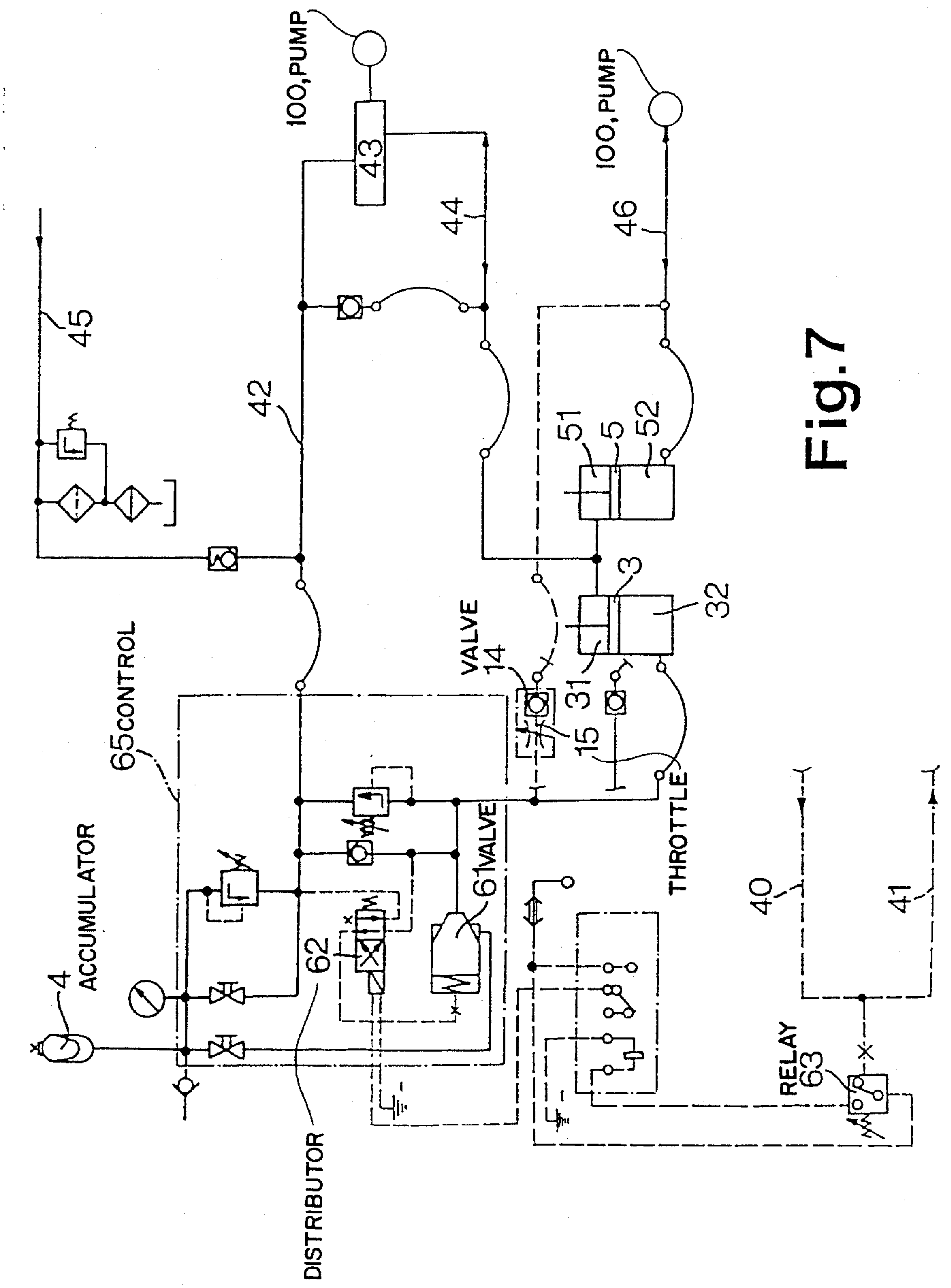

Another especially advantageous embodiment of the device is shown in FIGS. 7 and 8. The cartridge valve or seat valve shown in these drawings without a seal or gasket has a surface ratio of 1:12. In order to obtain optimum solution to the problem, the rod-side volume of piston chambers 31 and 51 is increased to be greater than the volume of the working cylinder on piston sides 32 and 52. In this case care is taken that the free annular surface of two working cylinders is greater than the acted-upon piston surface of a cylinder. The pressure relay shown in FIG. 7 or the pressure switch [push button] 63 can be effected by an anticipatory or servo-device through line 40 and has a branch 41 to the second control block of the machine. The second control block has a return flow branch 42 coming from the piston rod chamber, which is attached to the hydraulic arrangement 43 of the machine, which has at its disposal at least one feed pump for the fluid and one reservoir branch line. The second control block 44 is connected to hydraulic arrangement 43 and to the communicating link between piston rod chambers 31 and 51. A return flow line 45 from the first control block is shown at the top right in FIG. 7. At least one more control block 46, which is attached to a feed pump and a reservoir, is also attached to piston chamber 52 of working cylinder 5. The embodiment of FIG. 7 is especially suitable for pressure differentials of from 100 to 300 bar, and the embodiment as in FIG. 8, which corresponds to that of FIG. 6, is especially suitable for pressure differentials of from 180 to 300 bar.

I claim:

1. A device for recovering energy, comprising:

a first hydraulically operable working cylinder having a first rod end chamber and a first piston end chamber;

a hydropneumatic storage attached to said first piston end chamber of said first piston through a first line;

a second hydraulically operable working cylinder having a second rod end chamber and a second piston end chamber;

fluid carrying means for connecting and linking said first and second rod end chambers, and for connecting said second piston end chamber of said second cylinder to a hydraulic circuit with a pump;

a cartridge valve coupling said storage to said first piston end chamber; and control means having a control distributor connected to a pressure relay, and having a control input attached to a low pressure branch means for cooperating with movable parts of a working machine, said control distributor being connected to said cartridge valve.

2. A device according to claim 1 wherein a first switching means is between said first piston end chamber and said storage.

3. A device according to claim 2 wherein a reverse switching means is between said first piston end chamber and said storage, said reverse switching means having a reservoir connection.

4. A device according to claim 1 wherein a reverse switching means is between said first piston end chamber and said storage, said reverse switching means having a reservoir connection.

5. A device according to claim 3 wherein said first switching means and said reverse switching means are connected in series between said storage and said first piston end chamber.

6. A device according to claim 1 wherein a fluid-carrying conduit couples said first piston end chamber with said second piston end chamber, said fluid-carrying conduit having a first return valve therein.

7. A device according to claim 6 wherein a throttle element is connected in said fluid-carrying conduit in series with said first nonreturn valve;

a branch line is connected to said first line between said storage and said first piston end chamber and has a second nonreturn line therein, said branch line being connected to a liquid reservoir through a third nonreturn valve.

8. A device according to claim 7 wherein said control distributor comprises a reservoir connection and a feed line connection;

a two-way valve is connected between said reservoir connection and said first piston end chamber, and comprises an output connected to said feed line connection; and said reservoir connection is connected to said first and second rod end chambers by a conduit line crossed by a hydraulic adjusting cylinder.

9. A device for recovering energy, comprising:

a first hydraulically operable working cylinder having a first rod end chamber and a first piston end chamber;

a hydropneumatic storage attached to said first piston end chamber of said first piston through a first line;

a second hydraulically operable working cylinder having a second rod end chamber and a second piston end chamber;

fluid carrying means for connecting and linking said first and second rod end chambers, and for connecting said second piston end chamber of said second cylinder to a hydraulic circuit with a pump;

a first switching means between said first piston end chamber and said storage; and a reverse switching means between said first piston end chamber and said storage, said reverse switching means having a reservoir connection.

10. A device according to claim 9 wherein said first switching means and said reverse switching means are connected in series between said storage and said first piston end chamber.

11. A device according to claim 9 wherein a fluid-carrying conduit couples said first piston end chamber with said second piston end chamber, said fluid-carrying conduit having a first return valve therein.

12. A device according to claim 11 wherein a throttle element is connected in said fluid-carrying conduit in series with said first nonreturn valve;

a branch line is connected to said first line between said storage and said first piston end chamber and has a second nonreturn line therein, said branch line being connected to a liquid reservoir through a third nonreturn valve.

13. A device according to claim 9 wherein a cartridge valve couples said storage to said first piston end chamber;

control means, having a control distributor connected to a pressure relay and having a control input, is attached to a low pressure branch means for cooperating with movable parts of a working machine, said control distributor being connected to said cartridge valve;

said control distributor comprises a reservoir connection and a feed line connection;

a two-way valve is connected between said reservoir connection and said first piston end chamber, and comprises an output connected to said feed line connection; and said reservoir connection is connected to said first and second rod end chambers by a conduit line crossed by a hydraulic adjusting cylinder.

* * * * *